United States Patent
Tartaglia et al.

(10) Patent No.: US 8,730,239 B2
(45) Date of Patent: May 20, 2014

(54) TRANSITIONING BETWEEN SHADING REGIONS ON AN OBJECT

(75) Inventors: Bruce Nunzio Tartaglia, Santa Monica, CA (US); Doug Cooper, Glendale, CA (US); Pablo Valle, Glendale, CA (US); Michael McNeill, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 236 days.

(21) Appl. No.: 13/418,260

(22) Filed: Mar. 12, 2012

(65) Prior Publication Data
US 2012/0169757 A1  Jul. 5, 2012

Related U.S. Application Data (62) Division of application No. 11/975,031, filed on Oct. 16, 2007, now Pat. No. 8,159,490.

(51) Int. Cl.
*G06T 15/50* (2011.01)

(52) U.S. Cl.
USPC ........................................................ 345/426

(58) Field of Classification Search
None
See application file for complete search history.

(56) References Cited

U.S. PATENT DOCUMENTS

| | | | |
|---|---|---|---|
| 6,760,024 B1 | 7/2004 | Lokovic et al. | |
| 7,443,394 B2 | 10/2008 | Anderson et al. | |
| 7,536,047 B2 | 5/2009 | Borshukov et al. | |
| 7,737,973 B2 | 6/2010 | Wheeler et al. | |
| 7,884,819 B2 | 2/2011 | Kuesel et al. | |
| 2003/0112237 A1* | 6/2003 | Corbetta | 345/426 |
| 2004/0239673 A1 | 12/2004 | Schmidt | |
| 2004/0263511 A1 | 12/2004 | West et al. | |
| 2005/0212795 A1* | 9/2005 | Anderson et al. | 345/419 |
| 2006/0028468 A1 | 2/2006 | Chen et al. | |
| 2006/0274064 A1* | 12/2006 | Dougherty et al. | 345/422 |
| 2007/0018980 A1 | 1/2007 | Berteig et al. | |
| 2008/0143720 A1* | 6/2008 | Elmquist | 345/426 |

OTHER PUBLICATIONS

Partial European Search Report received for European Patent Application No. 08253294.6, mailed on Apr. 26, 2010, 6 pages.
Extended European Search Report received for European Patent Application No. 08253294.6, mailed on Aug. 13, 2010, 10 pages.
Non Final Office Action received for U.S. Appl. No. 12/061,435, mailed on Sep. 24, 2010, 12 pages.
Office Action received for European Patent Application No. 09250808.4, mailed on Jan. 19, 2011, 6 pages.
Non Final Office Action received for U.S. Appl. No. 11/975,031, mailed on Mar. 25, 2011, 26 pages.
Office Action received for European Patent Application No. 08253294.6, mailed on May 30, 2011, 4 pages.

(Continued)

*Primary Examiner* — Daniel Hajnik
(74) *Attorney, Agent, or Firm* — Morrison & Foerster LLP (57) ABSTRACT

Embodiments relate to a computer-implemented method of providing a transition between first and second regions within a virtual scene, where the first and second regions are rendered using different methods and being connected to one another along a border line. The second region features a sharply diminishing illumination from the border line. The method includes adding, an overlay of additional illumination to the first region as to make the illumination in portions of the first region that are close to the borderline similar to that of portions of the second region that are close to the border line. The method also includes shifting a position on which calculation of the illumination of the second region is based away from the first region.

4 Claims, 10 Drawing Sheets

(56) References Cited

OTHER PUBLICATIONS

European Search Report and Written Opinion received for European Application No. 09250808.4, mailed on Aug. 11, 2009, 8 pages.

Final Office Action received for U.S. Appl. No. 11/975,031, mailed on Oct. 4, 2011, 25 pages.

Office Action received for European Patent Application No. 08253294.6, mailed on Nov. 22, 2011, 5 pages.

Notice of Allowance received for U.S. Appl. No. 11/975,031, mailed on Dec. 13, 2011, 5 pages.

Notice of Allowance received for U.S. Appl. No. 12/061,435, mailed on Feb. 4, 2011, 12 pages.

D'Eon et al., "Efficient Rendering of Human Skin", Rendering Techniques: 18th Symposium on Rendering, Grenoble, France, Jun. 25, 2007, pp. 147-157.

Dachsbacher et al., "Translucent Shadow Maps", Eurographics Symposium 2003, The Eurographics Association, 2003, pp. 197-201, 311.

Jensen, H. W., "Realistic Image Synthesis Using Photon Mapping", 1st Ed., AK Peters, Ltd., Chapters 4-6, Jul. 15, 2001.

Kniss et al., "Interactive Translucent Volume Rendering and Procedural Modeling", In VIS '02: Proceedings of the conference on Visualization '02, 2002, pp. 109-116.

Lokovic et al., "Deep Shadow Maps", Proceedings of the 27th annual conference on Computer graphics and interactive techniques, Jul. 2000, pp. 385-392.

\* cited by examiner

TRANSITIONING BETWEEN SHADING REGIONS ON AN OBJECT

CROSS-REFERENCE TO RELATED APPLICATION

This application claims priority to U.S. patent application Ser. No. 11/975,031, filed Oct. 16, 2007, which is incorporated herein by reference in its entirety.

BACKGROUND

1. Field

This application relates to the electronic rendering of images and movies in general and more specifically to the shading of translucent objects.

2. Related Art

Computer graphics are used in various fields, such as animation, computer games, etc. An important goal of computer graphics is the ability to generate virtual images that are realistic and/or esthetic. A major impediment to reaching this goal is the inherent computational limitations of existing computer systems.

More specifically, lighting continues to pose challenges in the field of computer graphics. Naturally, light is an important factor in how one perceives an image. An observer (e.g., a human eye or a camera) perceives an object by detecting light reflected from that object (in other cases the light may be passing (or transmitted) through the object or be refracted by the object instead). The light detected from an object may be classified in two types. Direct light is light that travels directly from a light source to the object and to the observer. Indirect light is light that does not travel directly from a light source to the object. For example, indirect light may be light that is reflected from another object before it reaches the object being observed. Alternatively, indirect light may be light that goes through a translucent object before reaching the object being observed.

In the real world, much of the light that we use to perceive the world around us is indirect light. Thus, we can usually see objects that are not directly exposed to a particular light source. For example, in a bright day, a room with a window is usually well-illuminated even if the sun does not directly shine through the window, because the sun's rays reflect from the surrounding scenery and pass through the window, thus illuminating the room.

Considering the above, a perfect computer graphics system would be able to track indirect light to ensure realistic illumination of objects. Unfortunately, for most situations, such a system would be impractical as it would require a very large amount of computing resources. In order to account for indirect light, one has to trace each light ray (or photon) from a light source and off of all objects from which it reflects (this is sometimes referred to as ray tracing). Considering the incredibly large number of light rays illuminating a scene, and the complex paths each light ray may take when being reflected of various objects in a scene, this is not practical.

For the above reasons, many current computer graphics systems are direct light systems. In other words, they usually only take into account light going directly from a light source to an observed object when calculating how that object should be displayed. While using a direct light system significantly reduces computational costs, these systems may, in certain situations, create images that are very unrealistic.

For example, direct light systems do not correctly render translucent objects, without further modifications. A translucent object is an object which allows light to pass through it and modifies the light as it passes through it. Thus, seeing a translucent object usually involves seeing at least some of the light that passes through the object. However, light that passes through an object is not considered direct light by the standard direct light models and is thus not rendered by systems employing these models. In other words, systems utilizing standard direct light models usually render translucent objects as being completely opaque. This is naturally undesirable.

Some direct light systems render translucent objects by performing some type of ray tracing for these objects. Thus, these direct light systems depart from the direct light model when rendering translucent objects, in order to correctly convey the translucency of these objects. This is done under the assumption that translucent objects are relatively rare, therefore the additional computational requirements for performing ray tracing for these objects would not be too high. However this method cannot be efficiently employed in scenes in which large numbers of translucent objects exist.

While the above discussion centers on the desirability of realism in computer graphics, it should be noted that in many cases realism need not be the over-riding goal of a computer graphics system. It is well accepted that an image created by a talented artist may be much more compelling than the real image the artist based his composition on. Many computer graphics systems are used to assist artists in creating images or video. Thus, while realism is always a desirable quality of a computer graphics system it is also often desirable that the system offer sufficient artistic control as to allow an artist to create compelling visuals even if these visuals are not strictly realistic.

What is needed is a scheme for rendering translucent objects that does not impose very high computational requirements, even if comparatively large numbers of translucent objects have to be rendered. Also needed is a system that renders translucent objects while providing an artist with sufficient artistic control.

SUMMARY

Embodiments of the invention relate for rendering translucent objects. According to some embodiments, the color of a pixel of a translucent object that is not directly illuminated by a light source can be determined by decaying the illumination contributed by the light source according to a predefined decay function. The decay function may be, for example, an exponential decay function.

The decay function may be evaluated based on an initial illumination contributed by the light source, and a transmittance distance. The transmittance distance may be the distance through the object the light must travel in order to reach the pixel. In some embodiments, the transmittance distance may be calculated based on a depth map. In some embodiments, the transmittance distance may be the distance from the first object in the path of the light to the pixel even if some of this distance is taken up by empty space and not by translucent material. In some embodiments, a predefined optical density of the translucent object may also be used for evaluation of the decay function.

Once the illumination is decayed it can be applied to a predefined initial color of the pixel in order to obtain a final color of the pixel.

In some embodiments, the initial color of the pixel is decayed instead of the illumination. Once the initial color of the pixel is decayed the original unmodified illumination can be applied to the decayed color to obtain a final color. The color of the pixel can be decayed by applying a decay function individually to each of the three primary color components of the color. In some embodiments, the function can be such that as a result of decaying the color, the hue of the color shifts as well as its brightness.

Also disclosed is modifying the renderings of different regions of an object which have been rendered using different methods in order to remove sharp contrasts between these regions. For example, a directly illuminated and translucently illuminated portions of a single object can be modified according embodiments to the present invention in order to soften the transition between these objects.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
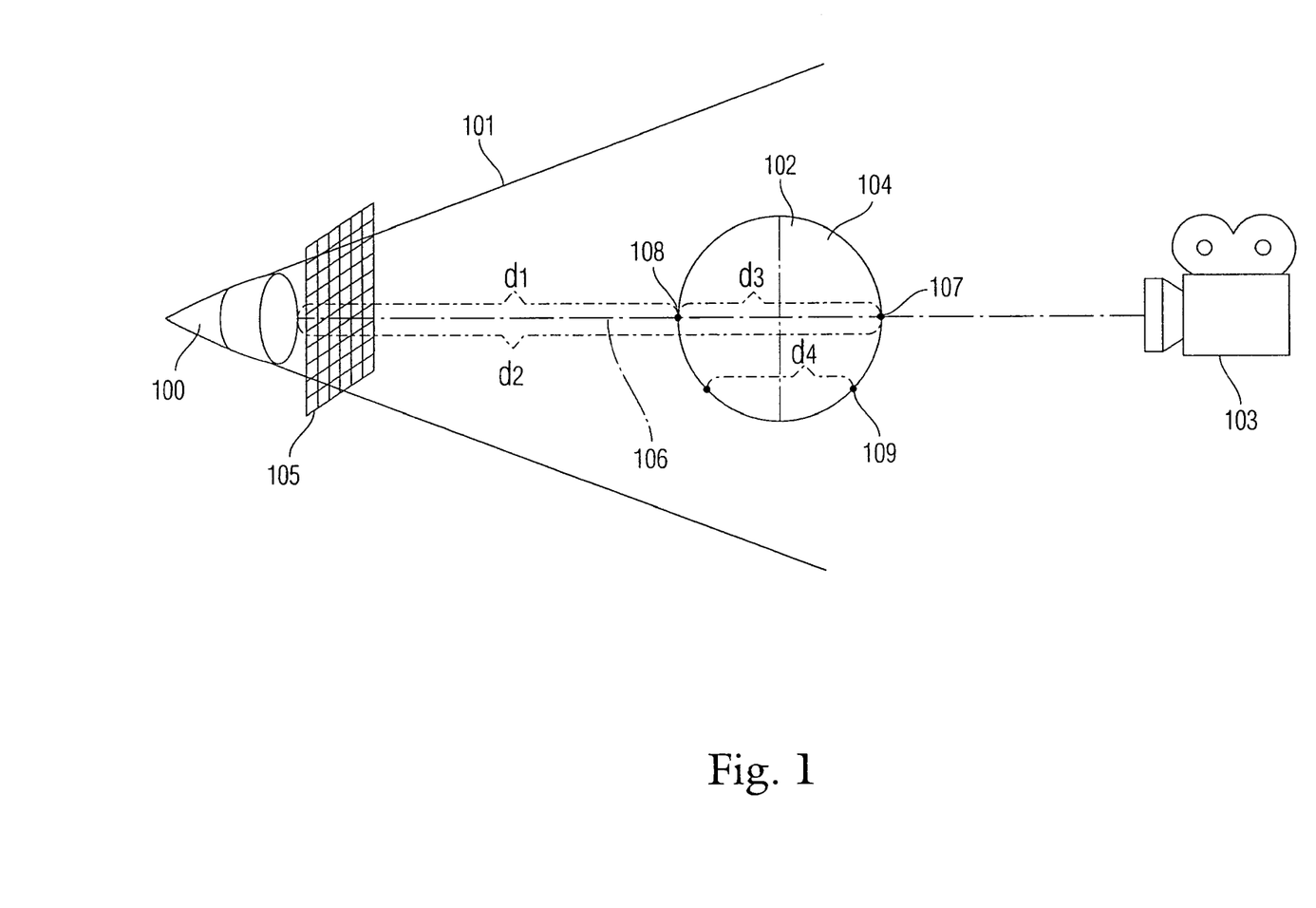
FIG. 1 is an illustration of an exemplary scene including a translucent object according to embodiments of the present invention.

Embodiments of the present invention are directed to modifying a direct illumination scheme for rendering graphics in order to enable correct rendering of translucent objects. FIG. 1 illustrates a direct illumination scheme for rendering computer generated graphics. FIG. 1 shows various elements which are represented as belonging to a virtual scene. The scene is a plurality of objects which are used for the purposes of creating or rendering images or video. The objects of a scene may be objects that are intended to be visible in the rendered images, or other objects, such as light sources or cameras that need not be visible but may still affect the rendered image. The objects defining a scene are usually generated by a computer and stored in a computer memory. Thus, a scene may be defined by various digital definitions of objects belonging to it, as well as data defining the various special relationships between the objects.

A light source 100 is placed in a scene. Light source 100 is of the spotlight type. In other words, it provides light rays that originate at a point but only extend to a limited radial range. Spotlight types of lights are well known in computer graphics. Other known types of lights are point lights which provide light originating at a point and extending in all directions, and directional lights which provide parallel rays of light. While the present invention is discussed in the context of spotlights, it is applicable to other types of lights as well.

In a computer graphics model, light 100 may be defined by its position and the cone 101 within which it emits light. An object 102 is also placed within the scene. The object 102 is a sphere but it may be any other object. Camera 103 defines the desired point of view. In other words, camera 103 is the point of view from which a computer generated image is to be created.

In a standard direct illumination model, usually only objects or portions thereof which are directly illuminated by light 100 are lit. Therefore, in a standard direct illumination model, the portion 104 of object 102 facing away from the light 100 would not be lit. A known way to determine which portions of objects should be lit and which are in shadows for a direct illumination model is through the use of depth maps.

A depth map (also referred to as a shadow map) is an array of data associated with a particular light source (such as light source 100). The depth map holds the distance between each ray of light emitted by the light source and the closest object blocking that ray of light. In this particular model, a "ray of light" is an abstraction used for computational purposes. It signifies a line in space through which light travels, and need not be associated with a single photon. The number of rays of light emitted by a single light source may vary and depend on the desired resolution of the scene. However, this number is usually much smaller than the number of actual photons emitted by a real source of light.

The depth map is shown in FIG. 1 as array 105. It may include an entry for each ray of light emitted from the light source 100. For example, the entry associated with ray 106 may hold the value $d_1$ indicating the distance between the light source and the portion of object 102 which blocks that ray.

When rendering the scene for camera 103, the system may first examine all objects that are visible to the camera. It may then tessellate and rasterize these objects according to methods known in the art. After the tessellation and rasterizing steps, the system has a plurality of pixels which compose the visible scene. The next step is to shade the pixels or, in other words, determine the color of the pixels.

In order to determine the color, the system must first determine how much and what type of light each pixel receives. Existing direct illumination systems accomplish this by determining whether the pixel is being illuminated or is in a shadow with regard to each light source in the scene. After that, the amount of light received from each light source is added. The light contributed from various light sources may also be modified to account for the angle between the incident light rays and the surface of the pixel, because light which is incident at oblique angles to the surface is usually reflected less brightly than light incident at perpendicular or near perpendicular angles to the surface. The angle of light is usually accounted for by taking a dot product of a vector representing the direction and magnitude of incident light with a unit length vector normal to the surface of the pixel. Colors of the light emitted by various light sources may also be taken into account when aggregating the light sources illuminating a pixel.

Thus aggregated, the light illuminating a pixel is used in conjunction with the color and texture of the surface associated with the pixel to determine the color and brightness of the pixel to be shaded or rendered.

Accordingly, in order to execute the above discussed procedure, one must determine whether a pixel is illuminated by each light source in the scene or not. First, it is determined whether the pixel in question is in the general illuminated space of a light source (e.g., the cone 101 of light source 100). If the pixel is within the cone, it is then determined whether the pixel is within a shadow of any objects as it relates to that light source. To determine that, the shadow map associated with the light source is used. For example, if pixel 107 is being examined with respect to light source 100, then shadow map 105 will be used. The distance between the pixel and the light source is obtained and compared with the distance between the light source and the closest object to the light source in the direction of the pixel as stored in the shadow map 105.

For example, if pixel 107 is being examined for illumination from light source 100, the distance between the pixel and the light source $d_2$ is compared with the distance between the light source and the nearest object $d_1$ ($d_1$ having been obtained from shadow map 105). If $d_2$ is equal to $d_1$ it means that the pixel being examined is not in the shadows of any objects as relating to light source 100. If, on the other hand, $d_2$ is greater than $d_1$, then the pixel is in a shadow and should receive no light from light source 100. It can be seen in FIG. 1 that, for pixel 107, $d_2 > d_1$. Therefore, pixel 104 is in a shadow relative to light source 100 and should not receive any illumination from that light source. This technique is referred to in computer graphics nomenclature as Percentage Closer Filtering (PCF).

Thus, for the scene of FIG. 1 and using the standard direct light illumination model discussed above, pixel 107 will appear to camera 103 as being completely dark, as will the entire right portion 104 of object 102. However, if object 102 is a translucent object, the surface of its right portion (including pixel 107) should receive some light that passes through the object.

Therefore, according to embodiments of the present invention, the direct light model discussed above is modified to take into account translucent objects. Thus, if it is determined that $d_2 > d_1$ (as is the case for pixel 107) and that object 102 is translucent, the pixel is not barred from receiving any light from light source 100. Instead, the pixel receives some light from the light source, but that light is modified according to a predetermined function.

The predetermined function is intended to represent the modification light undergoes as it passes through a translucent object. For that purpose, the predetermined function may take into account the distance between the pixel (i.e., pixel 107) and the point which first "blocks" the light ray directed towards the pixel (e.g., point 108 for light ray 106). This distance is shown in FIG. 1 as $d_3$ and may be expressed as:

$$d_3 = d_2 - d_1 \quad \text{EQ. 1:}$$

This distance is considered significant as it is the distance a light ray travels through a translucent object, and thus may signify the amount of modification the light ray may undergo as a result of traveling through the translucent object. Distance $d_3$ may be referred to as the transmittance distance.

In some embodiments, the light may be modified by modifying a light intensity. For example, an initial light intensity ($I_{init}$) representing the intensity of light being propagated by the light source may be obtained from the configuration of light source 100. From then, the light intensity may decay from the original intensity based on the distance $d_3$ as applied to a predefined decay function. Thus, the intensity of the light at point 107 ($I_{final}$) can be:

$$I_{final} = f_{decay}(I_{init}, d_3), \quad \text{EQ. 2:}$$

wherein $f_{decay}$ is a predefined decay function. The decay function may be such that $f_{decay}(I_{init}, 0) = I_{init}$ (indicating that at the leading point of the object 108 where $d_3=0$, the initial intensity of light is present) and $f_{decay}$ tends to decrease as $d_3$ increases (indicating that the longer a ray of light travels through a translucent object, the lower its resulting intensity may be). The function $f_{decay}$ can be associated with an optical density of object 102. More specifically, the more dense an object is the sharper the fall of $f_{decay}$ can be. Thus, each translucent object may include a respective decay function associated with it.

In some embodiments, $I_{init}$ may not be the actual intensity of the light source 100, but may be a special parameter indicating a transmittance intensity utilized for translucent objects. In other words the transmittance intensity of light 100 can be different than its ordinary (i.e., reflective) intensity.

Once obtained, the final intensity $I_{final}$ can be applied to an initial hue of pixel 107 in order to obtain a resulting color of that pixel. Thus, if pixel 107 is initially yellow, its color can be modified from dark yellow to light yellow based on how much light reaches it. The light reaching it may be obtained from the final intensity $I_{final}$ of the light contributed from light source 100. A color of the light emitted from light source 100 may also be used to determine the final color of pixel 107.

In some embodiments, the decay function can be evaluated multiple times for multiple points in the vicinity of pixel 107, as well as for pixel 107. The results of these multiple calculations can be averaged in order to obtain the final value of $f_{decay}$ for pixel 107. This can provide an anti-aliasing effect and ensure that no stark contrasts exist (stark contrasts in computer graphics are often considered to be unrealistic and thus undesirable).

Figure 2:
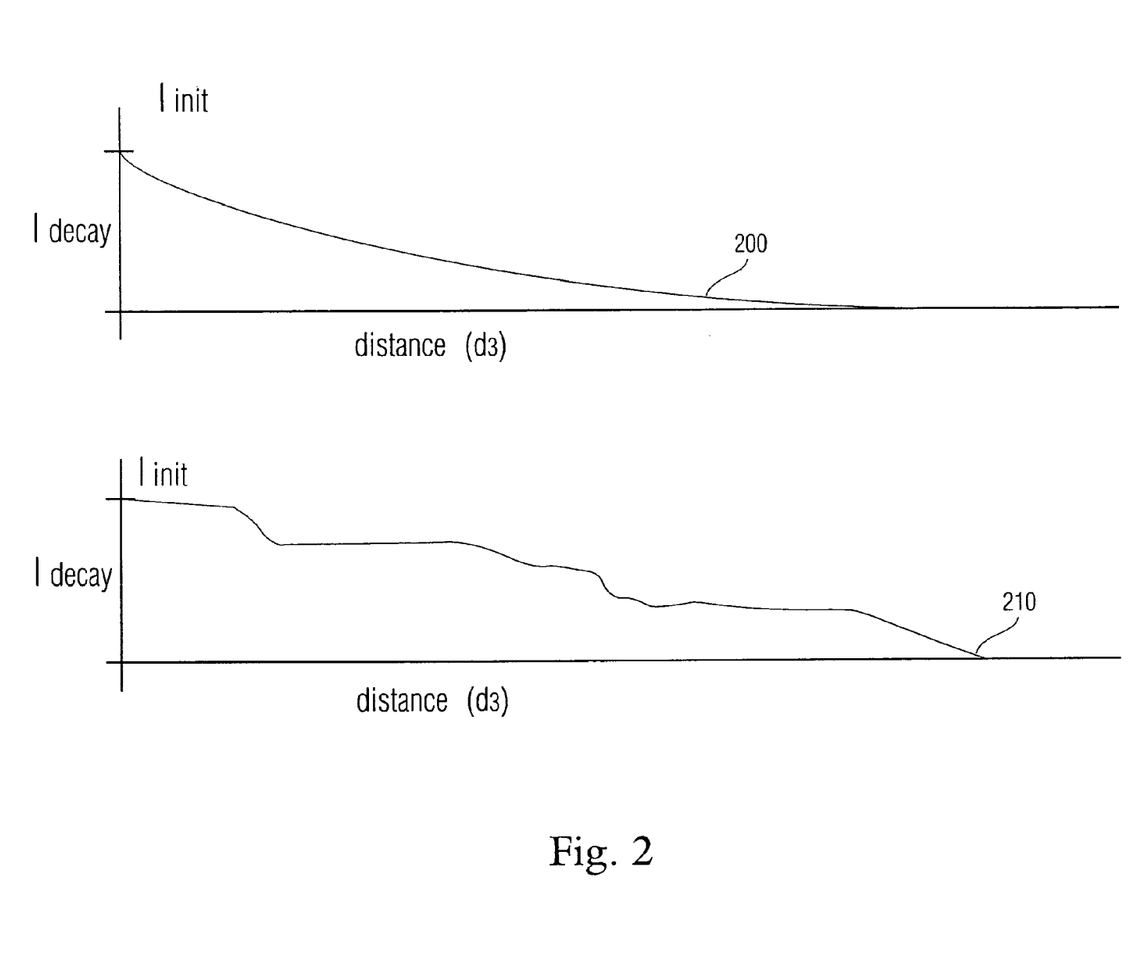
FIG. 2 includes graphs of exemplary decay functions according to embodiments of the present invention.

FIG. 2 includes diagrams of two different decay functions that can be used. These include an exponential function 200 and a custom function 210. If light intensity is generally defined as a number between 0 and 1, not including 1, with 0 signifying no light and 0.999999 . . . signifying maximum light intensity, the exponential function can be, for example:

$$f_{decay} = I_{init}^{(D \cdot (d_3 + 1/D))}, \quad \text{EQ. 3:}$$

where D is an optical density of object 102. It should be noted that if $d_3=0$, then, as discussed above, the decay function will be equal to the initial intensity. Also, since $I_{init} < 1$, larger values for D and $d_3$ will result in smaller results for the decay function. In other words, as discussed above, a larger transmittance distance and optical density will result in a greater decrease of light intensity. The distance $d_3$ is assumed to be larger or equal to 0. The density D is assumed to be larger than 0. Since, as noted above, $I_{init}$ is by definition less than 1, the exemplary $f_{decay}$ provided above will always result in decay, or a decrease of the initial intensity.

The custom function 210 can be a curve defined by an artist or another person or computer configuring the scene. In some embodiments, the custom function may be limited to decay type functions. Decay type functions may be functions which feature only downward or flat slopes. Also, the custom function may be limited to functions that have a value of $I_{init}$ at $d_3=0$ as shown in FIG. 2. Other types of functions (other than exponential and custom) can also be used. For example, a linear function can be used.

Once an $I_{final}$ is obtained it can be multiplied by an initial color of the pixel to obtain the final or illuminated color of the pixel. A color of the light emitted by the light source 100 may also be multiplied with $I_{final}$ and the initial color of the pixel. These multiplications can be performed by separately multiplying three initial component color values of the pixel with the intensity and/or corresponding component color values of the light.

In some embodiments, the process above can be modified by providing a decay function which is associated with the color of pixel 107 instead of the intensity $I_{final}$. Thus, while the above discussed embodiments decay the intensity, the present embodiments may keep the intensity constant but decay the initial color of the pixel instead.

The color of the translucent object 102 can be defined by three color components. These may be, for example, primary color components Red Green and Blue (R, G, B). Thus, a color can be defined by three numbers between 0 and 1, each defining a relative brightness of the R, G and B components. For the purposes of some embodiments of the present invention the color components may not be allowed to actually reach the value of '1'.

Therefore, a decay function associated with an object may include three component functions associated with each component color. For example, the component functions can be $f_{decayR}$, $f_{decayG}$ and $f_{decayB}$. Each of these functions can provide a respective component of the resulting color of pixel 107 (i.e., the color of pixel 107 that results from the illumination of light 100). Furthermore, each of the functions can depend on an initial component color value. Thus, if the initial color of pixel 107 is defined by color components $C_R$, $C_G$ and $C_B$ and the resulting color of pixel 107 is indicated by color components $C'_R$, $C'_G$ and $C'_B$, then the values of these components can be obtained according to the following:

$$C'_R = I_{init} f_{decayR}(C_R, d_3), \quad \text{EQ. 4:}$$

$$C'_G = I_{init} f_{decayG}(C_G, d_3), \quad \text{EQ. 5:}$$

and $$C'_B = I_{init} f_{decayB}(C_B, d_3). \quad \text{EQ. 6:}$$

In addition, values representing the color of the light emitted by light source 100 can also be multiplied when obtaining $C'_R$, $C'_G$ and $C'_B$. Again various functions can be used for the decay functions $f_{decayR, G, B}$. For example, exponential decay or custom functions similar to the functions shown in FIG. 2 can be used. The exponential decay functions can be, for example:

$$f_{decayR} = C_R^{(D \cdot (d_3 + 1/D))} \quad \text{EQ. 7:}$$

$$f_{decayG} = C_G^{(D \cdot (d_3 + 1/D))} \quad \text{EQ. 8}$$

$$f_{decayb} = C_B^{(D \cdot (d_3 + 1/D))} \quad \text{EQ. 9}$$

It should be noted that in this embodiment the color components $C_R$, $C_G$ and $C_B$ should be defined to be strictly less than 1. Therefore, the above equations will result in decaying or decreasing functions.

Additional embodiments of the invention can provide the user (e.g., an artist) with additional customizability of the decay functions. For example, in a pixel color decay embodiment, a user can set a position at which decay begins, a color value at which decay begins and a position and a color value at which decay ends.

Accordingly each object (such as object 102) can be associated with several values as follows: a starting color intensity value, an ending color intensity value, a starting distance, an ending distance and a decay function $f_{decay}$. These parameters can be specified by the party setting up the scene. The starting color intensity value can be higher than the ending one, and the starting distance can be lower than the ending distance. This is in accordance with an assumption that the color intensity (or brightness) decreases as light travels through a translucent object. In some embodiments, the starting and ending distances as well as the decay functions can be the same for all color components while the starting and ending color intensity values may be different. Other embodiments may also allow differing starting and ending distances and decay functions.

According to the present embodiments, if $d_3$ is equal to or lower than the starting distance then the resulting component color is equal to the starting color intensity value. If $d_3$ is equal or higher than the ending distance, then the resulting color is equal to the ending color intensity value. If $d_3$ is between the starting and ending distances, then the value of the resulting component color may be determined by referring to the various $f_{decay}$ functions.

Figure 3:
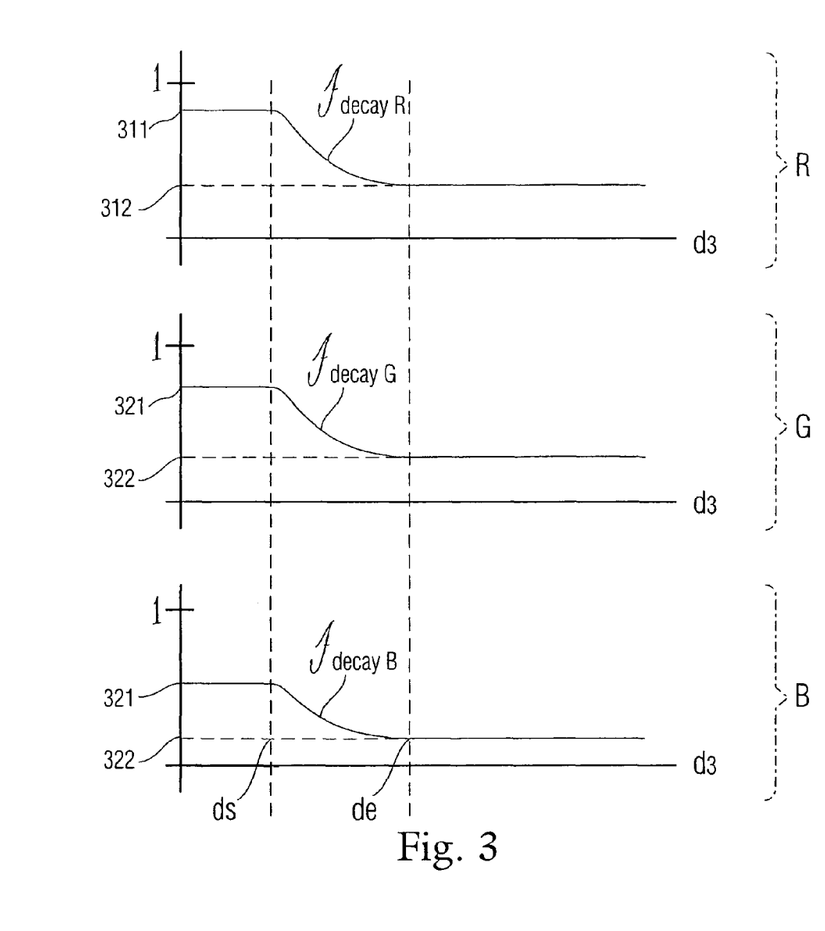
FIG. 3 includes graphs of exemplary decay functions according to embodiments of the invention.

FIG. 3 is an illustration of the above described system. It shows three graphs (310, 320 and 330) of resulting component colors based on a present embodiment. The starting and ending distances are $d_s$ and $d_e$, respectively. These distances are the same for all three graphs. The starting color intensity values are 311 for red, 321 for green and 331 for blue. It can be seen that these values are different for the different colors. The ending color intensity values are 312, 322, and 332 for red, green and blue respectively. These are also different for the different colors. It can be seen that for all $d_3 < d_s$ the value of each component color is equal to its respective starting color intensity. Similarly, for all $d_3 > d_e$ each resulting component color is equal to its respective ending color intensity. For al $d_3$ such that $d_s < d_3 < d_e$, the value of d3 is determined by decay functions $f_{decayR}$, $f_{decayG}$ and $f_{decayB}$. The decay functions can be such that they decay the resulting color value based on the distance $d_3$ and the optical density of the object D. Thus, they are similar to the decay functions of EQs 7-9. These decay functions may depend on an initial color component value (i.e., on the starting color intensity), in order to ensure that they connect with the initial portions of the graph at position $d_s$, as well as on an ending color component value (i.e., the ending color intensity) in order to ensure that they connect with the latter portions of the graphs at $d_e$. Thus, the decay functions of FIG. 3 differ from the decay functions of EQs 7-9 which only depend on an initial color component value. Decay functions $f_{decayR}$, $f_{decayG}$ and $f_{decayB}$ need not be identical.

In another embodiment, the functions of FIG. 3, may be simpler linear functions. The functions of FIG. 3 may be evaluated mathematically or by accessing previously stored color splines.

The actual color components of pixel 107 can be calculated by modifying the resulting color component values obtained from graphs 310, 320 and 330 to account of the initial intensity of the light produced by light source 100. In some embodiments, the color components can be further modified to take into account the color of the light emitted by light source 100. This may be done by multiplying the initial intensity and/or respective components of the color of the light with the resulting color component values. It should be noted that in these embodiment the light intensity is not decayed because the component colors of the pixel have been decayed instead.

Also, as discussed above, some embodiments can obtain color information for multiple pixels surrounding pixel 107, and average that information in order to obtain the color of pixel 107. This may provide an anti aliasing effect and avoid stark contrasts.

It should be noted that according the latter discussed pixel color decay related embodiments, light may shift in hue for different values of $d_3$. Thus, referring back to FIG. 1, pixel 109 may be such that the transmittance distance for pixel 109 ($d_4$) may be less than the transmittance distance for pixel 107 ($d_3$). If the translucent object is of a single color, one would expect that pixel 109 should be the same hue as pixel 107, but of a higher brightness, as the light that reaches pixel 109 is not as decayed as that for pixel 107.

However, according to the latter discussed embodiments, pixel 109 may also be of a different hue than pixel 107. This may be the case, for example, because the component decay functions for object 102 ($f_{decayR}$, $f_{decayG}$ and $f_{decayB}$) may not be identical. As a result, the different component colors may decay at different rates. This may in turn cause a hue shift between pixels that are at different distances and thus at different stages of decay (e.g., between pixels 109 and 107). Furthermore, even if the normal functions are identical for the different component colors, the component colors can still decay at different rates due to differences of the initial color components, starting distance, ending distance, starting color intensity and/or ending color intensity for each component color. While this effect seems counter intuitive and not realistic, it has been found to produce artistically compelling results in certain circumstances. Therefore, a hue shift in different portions of translucent objects can be a useful feature of certain embodiments of the invention.

Figure 4:
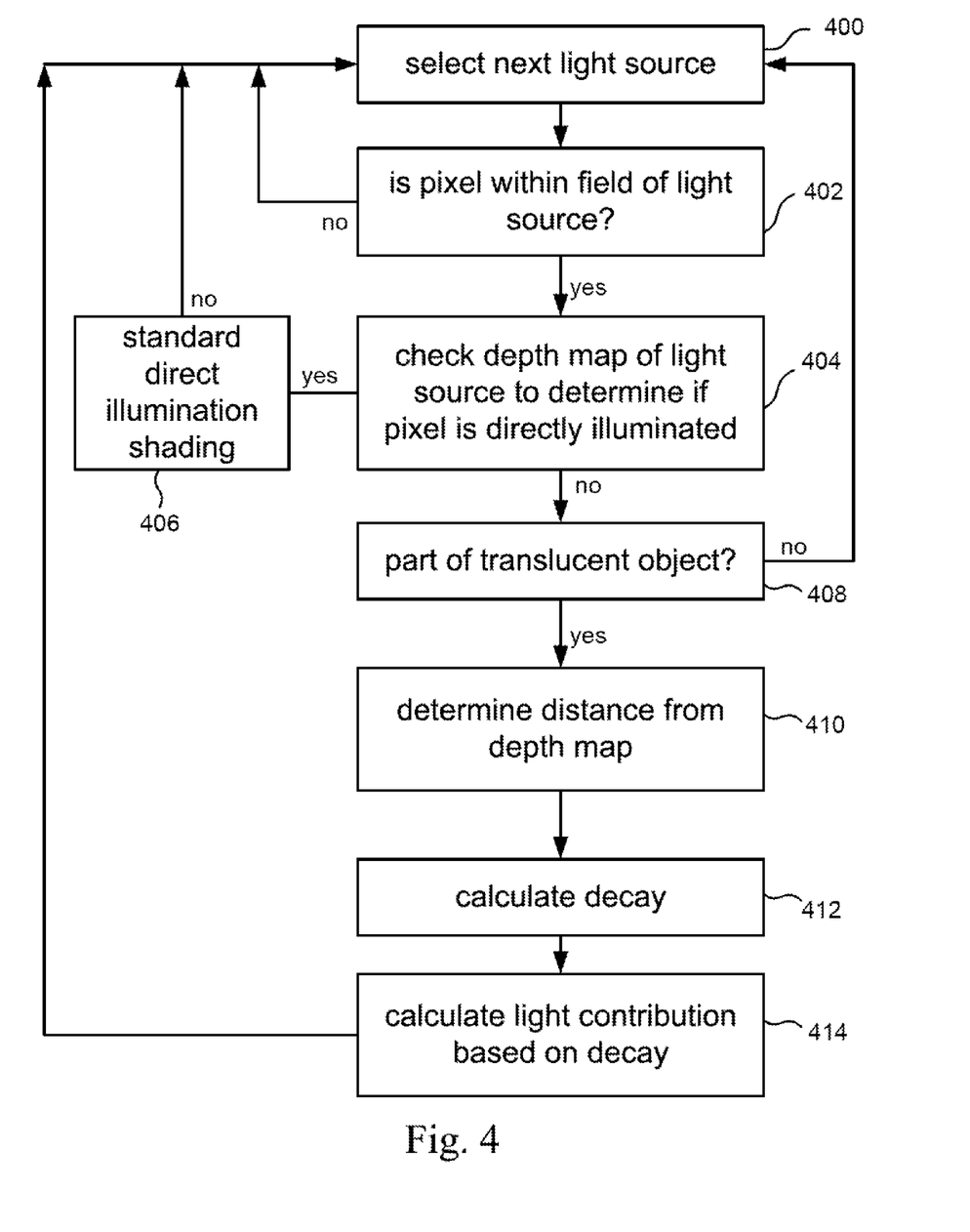
FIG. 4 is a flow chart showing an exemplary method of determining the color of a pixel according to embodiments of the invention.

FIG. 4 shows a method of practicing embodiments of the present invention. More specifically, FIG. 4 shows a method for determining the color of a pixel. At step 400, the next (or, as the case may be, the first) active light source in the scene is selected. At step 402, it is determined whether the pixel in question is within the field of light source. For example, for a spotlight light source such as light source 100 of FIG. 1, it can be determined whether the pixel is within cone 101. If that is not the case, the process proceeds to the next light source (step 400). If that is the case, the process proceeds to step 404. At step 404, the depth map of the current light source is checked to determine whether the current pixel is directly illuminated by that light source. If that is the case, standard known processing for a directly illuminated pixel may be performed (step 406).

If step 404 is not satisfied, the process proceeds to step 408, where it is determined whether the pixel is part of a translucent object. If that is not the case, the pixel can be considered to be in a shadow and can, for that reason, be considered to receive no illumination from the current light source. Thus, the next light source may be selected in step 400. However, it is noted that it is possible for a pixel to not be a part of a translucent object and yet still be able to benefit from light transmitted through the translucent object. For example, the pixel can be part of a solid object, but there may be a translucent object between the pixel and a light source. Some advanced embodiments of the present invention may select such pixels and use the teachings provided herein to determine how much light the pixel receives through the translucent object.

If the pixel is a part of a translucent object, then it probably receives light through the translucent object and processing can proceed to step 410. In some advanced embodiments, it may be determined whether the pixel, while being a part of a translucent object, is nevertheless blocked from a light source by another opaque object.

At step 410, the distance from the depth map is determined. More precisely, the distance $d_3$ of FIG. 1 is determined. This may be done by subtracting a depth map value associated with the pixel from the distance to the current light source, as shown in FIG. 1. At step 412, a decay is calculated based on decay function(s) associated with the pixel. As discussed above, the light intensity or the color of the pixel may be decayed. At this step other parameters such as initial color component values, start and end distances, etc. may be needed. These may be provided in a storage associated with the pixel or with the object the pixel is part of. Step 412 may be repeated multiple times for pixels proximate to the current pixel in order to obtain average decay values and thus avoid stark contrasts. At step 414, the total light contribution from the current light can be calculated based on the decay. This may include multiplying a decayed light intensity with pixel color values, or multiplying decayed pixel color values with a light intensity. Once the light contribution is calculated, it may be added to a running sum, and processing may begin for another light source at step 400.

Figure 5:
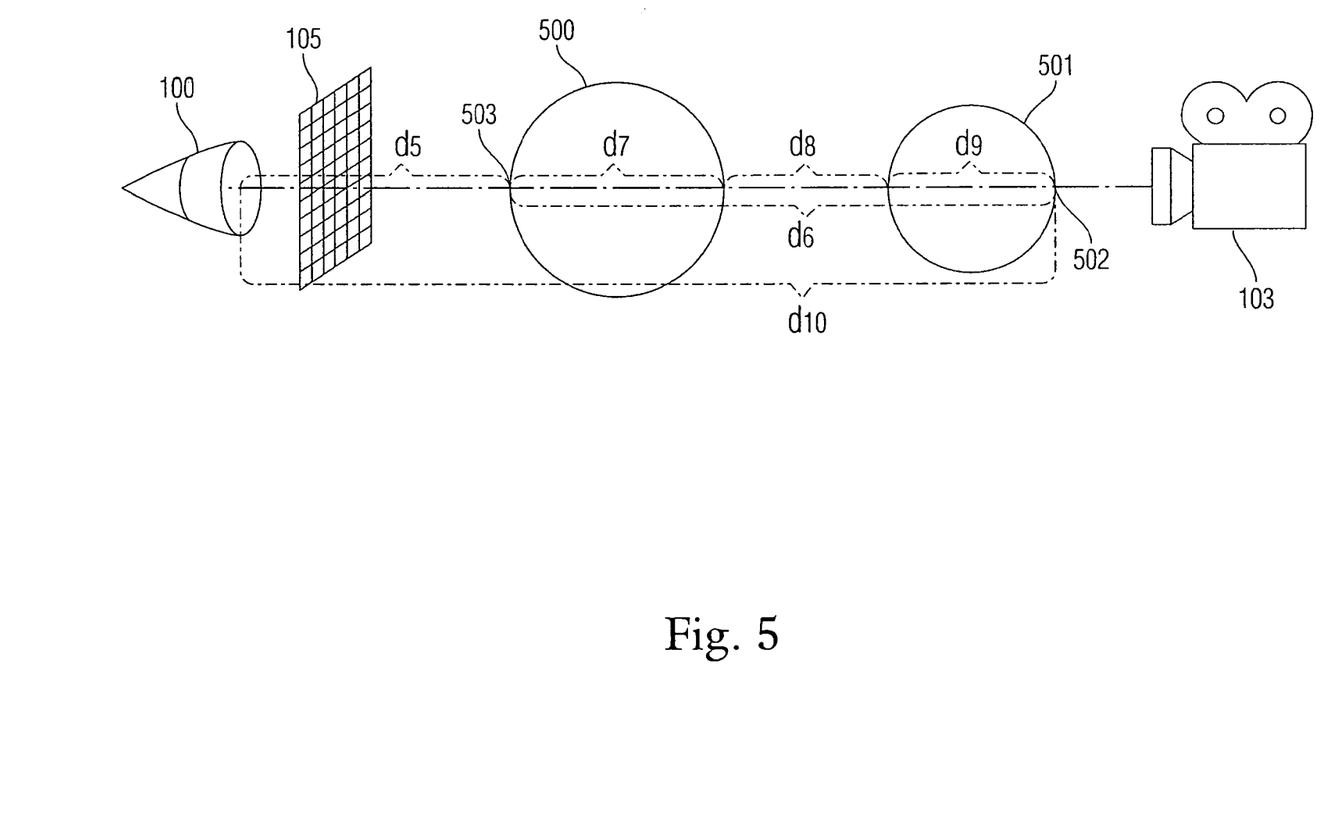
FIG. 5 is an illustration of an exemplary scene including two translucent objects according to embodiments of the invention.

FIG. 5 is a diagram of an alternative exemplary scene that includes two translucent objects—object 500 and 501. Pixel 502 positioned on the back side of object 501 is visible to the camera. However, both object 500 and 501 are between pixel 502 and light source 100.

When rendering pixel 502, the system must determine how much light that pixel receives from light source 100. Thus, depth map 105 can be consulted. Depth map 105 provides distance $d_5$ to the leading edge 503 of the closest object. That can be compared to the distance $d_{10}$ to pixel 502. Since $d_5 < d_{10}$, pixel 502 is not directly illuminated by light source 100. However, since object 502 is translucent, then indirect light can potentially reach pixel 502.

The amount of light reaching pixel 502 as well as the color of pixel 502 can be determined according to embodiments of the invention discussed above. It should be noted that some embodiments may treat objects 500 and 501 as a single continuous translucent object. More specifically, these embodiments may obtain the transmittance distance by subtracting $d_5$ from $d_{10}$. This may result in $d_6$ being the transmittance distance. However, it can be seen that $d_6$ may not accurately represent the transmittance distance because light is not transmitted through a translucent object for the entire distance $d_6$. Thus, the light does not decay through the entire distance $d_6$. Instead, in portion $d_7$, light is transmitted through object 500 and may decay. In portion $d_8$, light is transmitted through empty space (or air) and should not decay noticeably. In portion $d_9$, light is again transmitted through a translucent object (this time object 501) and should again decay.

On the other hand, certain embodiments of the invention may apply the entire distance $d_6$ to a decay function and thus assume that light decays through the entire distance (as would be the case if objects 500 and 501 were a single continuous object). Even if this were the case, the results may be considered acceptable and useful. In other words, this inaccuracy may be considered a worthwhile trade off for the efficiency and speed advantages of embodiments of the present invention.

If a system had to automatically keep track of where one object begins and another ends, the systems would have to keep track of and process the actual shapes of the objects, not just the depth maps of the various light sources. This would greatly add to the complexity and processing requirements of shading algorithms. Therefore, as noted above, the above discussed embodiments can be considered to be very useful approximations, even if they do not provide a perfectly correct result.

Figure 6:
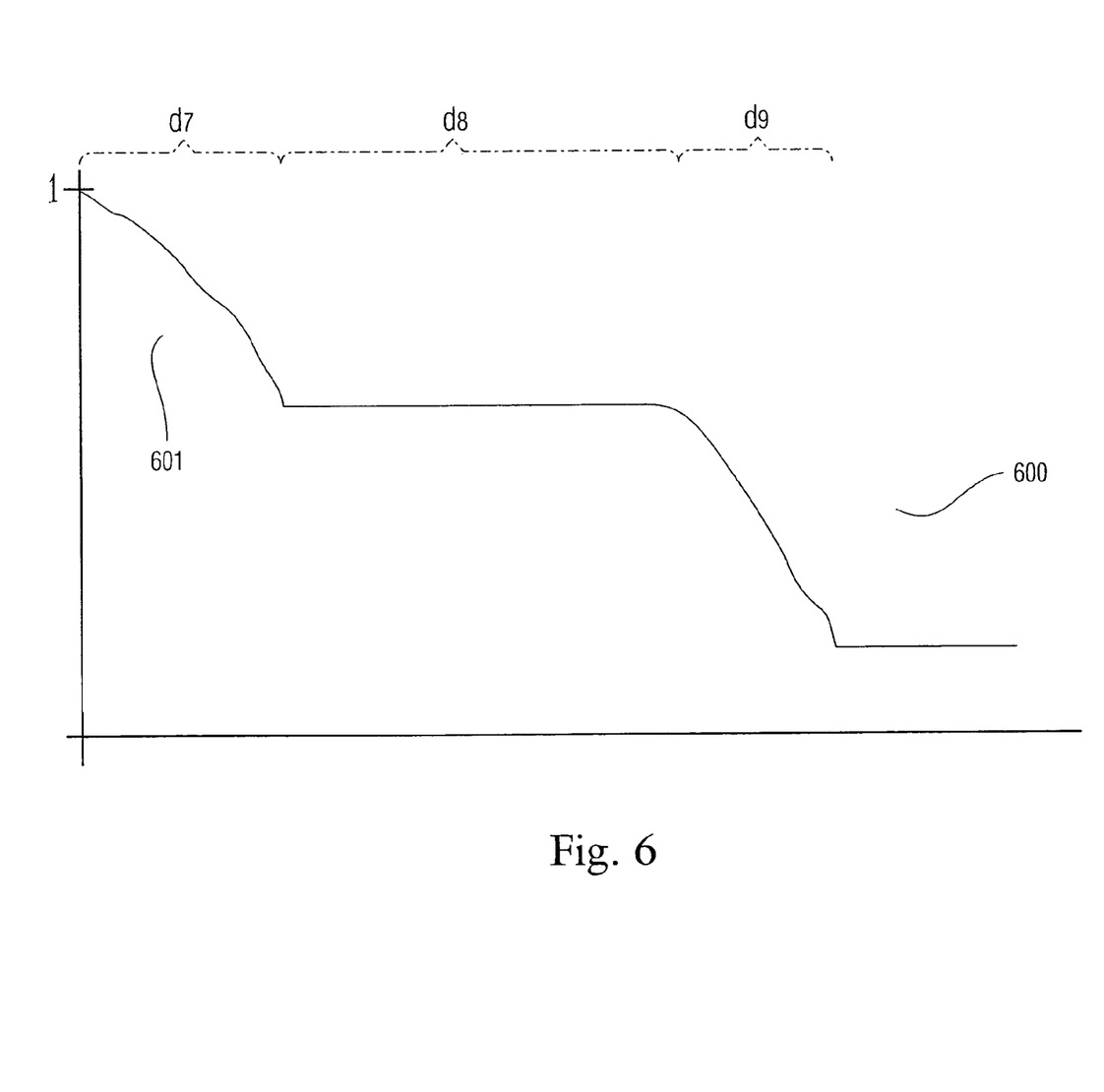
FIG. 6 is a graph of an exemplary decay function according to embodiments of the invention.

Furthermore, some embodiments of the present invention can be configured to more accurately render scenes similar to the one of FIG. 5 by utilizing a custom decay function. The custom decay functions can be similar to the decay function of FIG. 6. The custom decay function 600 can include a decay period 601 intended to represent portion $d_7$, a flat (non-decay) period 602 intended to represent portion $d_8$ and a second decay period 603 intended to represent portion $d_9$. Thus, decay function 600 would more accurately represent the decays associated with the different objects and the lack of decay associated with the space between the objects. Decay function 600 can be prepared by an artist, or another operator configuring the scene. The function can also be generated by a computer. A function like decay function 600 can be used with the various embodiments of the invention discussed above.

It should be noted that the embodiments discussed herein refer to indirect illumination received through translucent objects. These embodiments may include computer graphics systems that handle other well known methods of illumination. For example, the embodiments of the present invention may also handle direct illumination through well known methods. Furthermore, embodiments of the present invention may also incorporate the teachings of U.S. patent application Ser. No. 11/801,163 filed on May, 8, 2007 and entitled "System and Method for Rendering Computer Graphics Utilizing a Shadow Illuminator" (incorporated herein by reference).

Thus, embodiments of the invention can use different illumination calculation techniques for shading different pixels within a scene. Furthermore, if a single pixel (such as, for example, pixel 107 of FIG. 1) is illuminated by multiple light sources at the same time, different techniques can be used to determine the illumination contribution of each light source so that the pixel can be shaded in accordance with the total illumination received by all light sources.

Figure 7:
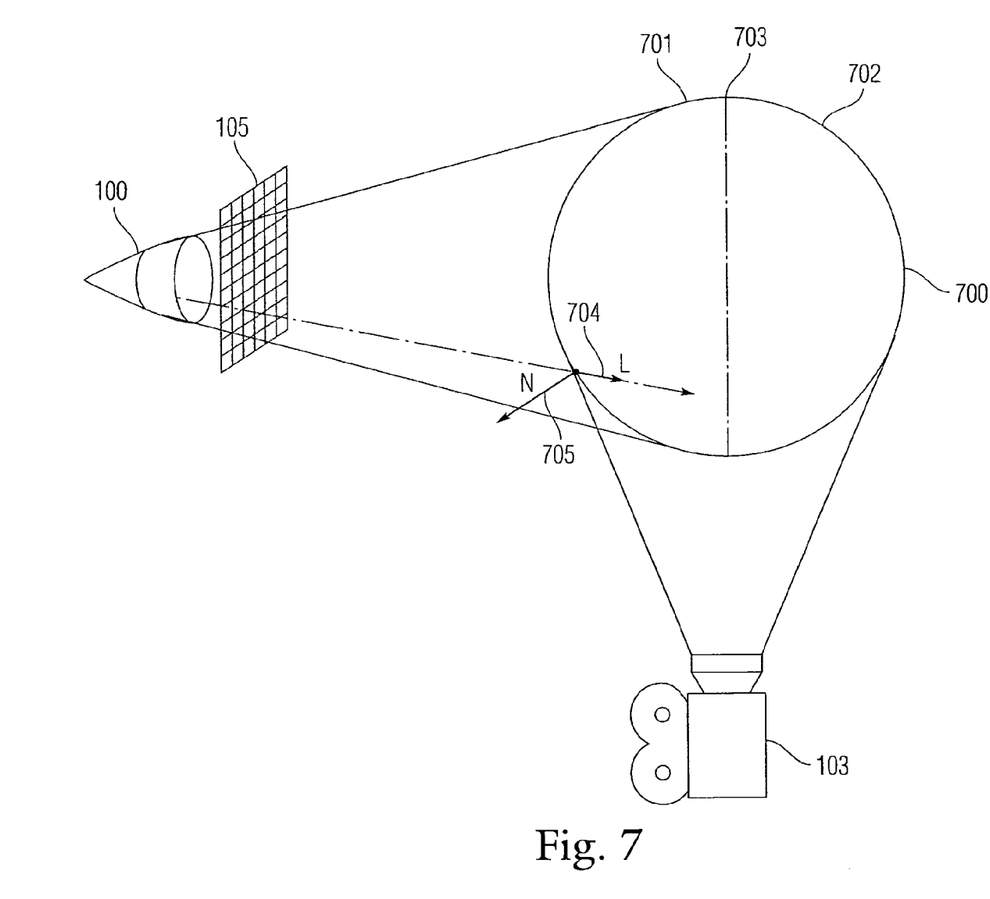
FIG. 7 is a diagram of an exemplary scene including a translucent object according to embodiments of the invention.

However, the presence of different schemes of light illumination calculation can cause certain undesirable and unrealistic effects. For example, FIG. 7 illustrates an exemplary scene, in which a directly illuminated and an indirectly illuminated portion of the same object are visible by a camera.

Light source 100 illuminates translucent object 700. Front portion 701 of the object is directly illuminated. Therefore, the illumination of portion 701 may be determined according to well known direct illumination methods. Rear portion 702 is not directly illuminated, but since object 700 is translucent rear portion may be illuminated by light passing through object 700. This indirect illumination may be calculated according to one or more of the embodiments discussed above.

Therefore, at the region around line 703, there may be pixels that are close to each other, but for which illumination is calculated in two different manners. This may cause a sharp difference in illumination between the pixels to the left and the right of line 703, which may in turn cause a sharp and unrealistic difference in color.

Therefore, certain embodiments of the present invention provide for modifying the illumination within the vicinity of line 703 in order to ensure a smoother transition between the direct and indirect illumination regions.

In order to ensure a smooth transition, the parts of the directly illuminated portion 701 that are close to line 703 are provided with additional illumination. This illumination may be provided by sending additional illumination $I_{additional}$ to the entire illuminated portion 701, wherein for each respective pixel within portion 701, the additional illumination is:

$$I_{additional} = 1(N \cdot L),\qquad \text{EQ. 10:}$$

wherein L is a unit vector in the direction of incident light rays received from light source 100 at the respective pixel and N is a unit vector normal to the surface of object 700 at the respective pixel. See, for example, vectors 704 (L) and 705 (N). Furthermore, (N·L) is the dot product of N and L. A person of skill in the art would recognize that, as defined, $I_{additional}$ largest where vectors N and L are perpendicular or close to perpendicular. Thus, $I_{additional}$ is largest around the edges of area 701 close to line 703. Thus, the additional illumination mostly serves to illuminate the portions of area 701 that are close to the transition to area 702.

Figure 8A:
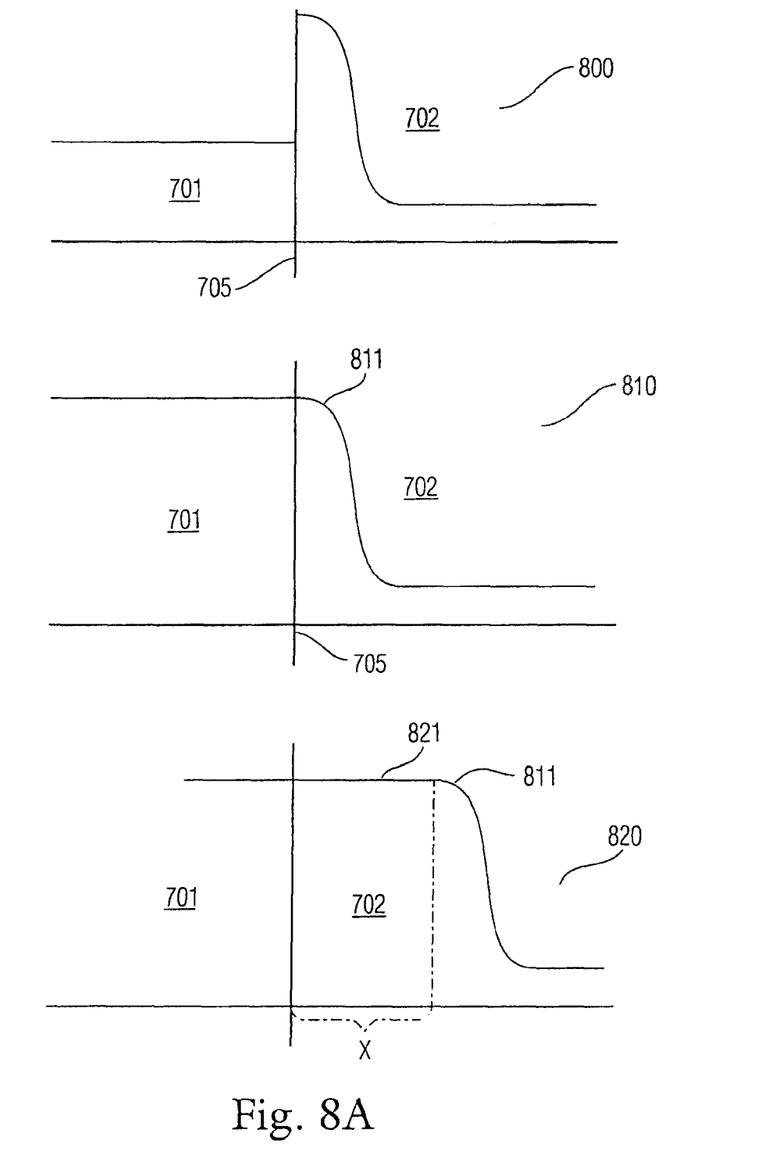
FIGS. 8A and B include graphs showing exemplary illumination distributions in proximity to a border between a directly illuminated region and an indirectly illuminated region according to embodiments of the invention.
Figure 8B:
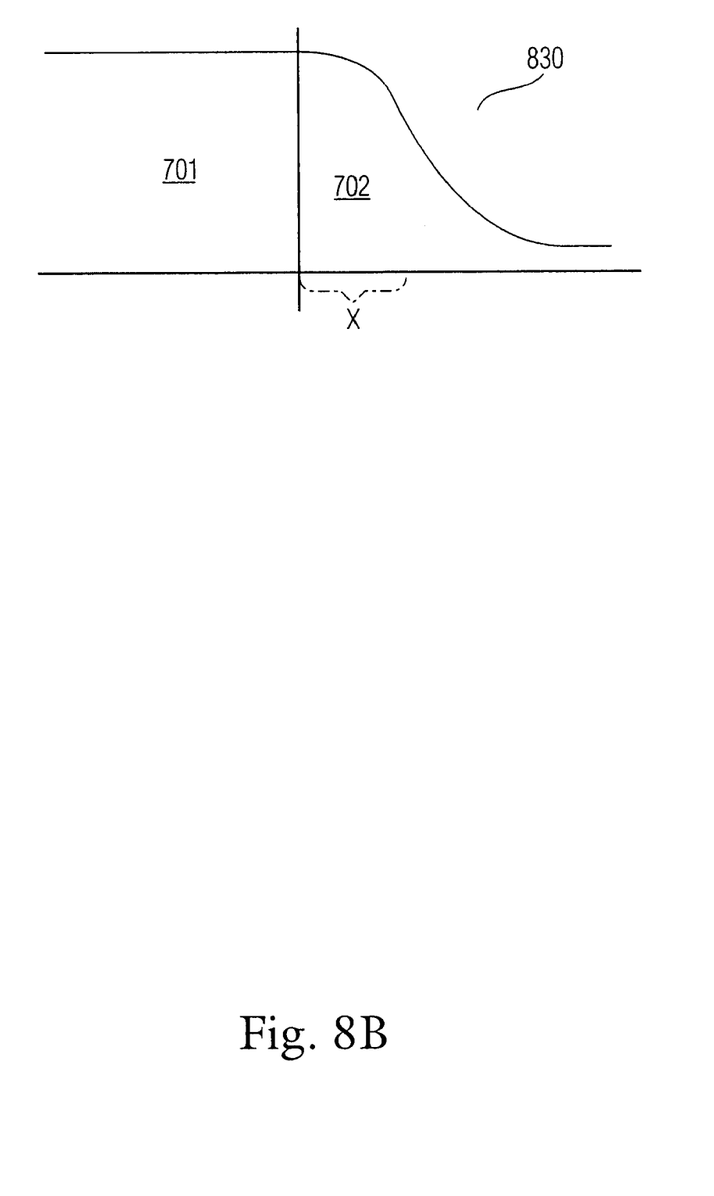

FIGS. 8A and B show graphs illustrating the illumination of pixels in proximity to line 705 which separates the directly illuminated region 701 from the indirectly illuminated one 702. Graph 800 may show the illumination distribution before the additional illumination $I_{additional}$ is sent to the directly illuminated region.

Line 705 may be considered a position where $d_3=0$ according to the indirect illumination schemes discussed above. Therefore, at line 705 and in the immediate vicinity little if any decay is taking place on the indirectly illuminated side 702 (see above as to why no decay takes place when $d_3=0$). Therefore, the illumination level on the indirect 702 side of line 705 may be relatively high.

On the other hand, the illumination on the 701 side is relatively low, as in that region the rays of light coming in from the light source are very oblique (almost parallel) to the surface. Therefore, it may be helpful to add the additional illumination $I_{additional}$ which may lift the illumination level in area 701 in order to match that of area 702 at line 705.

Graph 810 shows an exemplary illumination distribution after the additional illumination has been added to the 701 side. Thus, both sides of line 705 may match in illumination. However, the sharp decay of the illumination on the 702 side may still cause a stark and unrealistic contrast. This may be made worse if the averaging (or anti-aliasing) system discussed above is used. While averaging usually removes stark contrasts, it may be counter productive in this context, because pixels on the 702 side cannot use pixels on the 701 side for averaging purposes. This limitation may exist because of the differences in calculating illumination for pixels of the two sides. More specifically, pixels on the 702 side may be served by software configured to handle indirectly illuminated pixels. That software may consequently be unable to calculate the illumination of pixels on the 701 side for the purpose of averaging.

Thus, if averaging is used a pixel close to the left side of line 705 (e.g., pixel 811) will not be able to locate much proximate pixels on its right side for the purpose of averaging. Consequently, that pixel may use only pixels on its left side which are all much lower than it. This may decrease the illumination of pixel 811 and cause exaggeration of the stark contrast problem.

To address the above, the illumination distribution of the 702 side may be "slid to the left" to allow for a "plateau" 821 of high illumination on the left side. This can be achieved by changing the value of $d_3$. More specifically, a new value of d3 may be used, the new value being such that:

$$d_{3new} = \max(0,(d_3-x))\qquad \text{EQ. 11}$$

"Max" may be a function that returns the largest of its attributes. The variable x may be the amount of distance the illumination distribution is moved to the left. It should be noted that after this move, d3 is not strictly accurate as it relates to the distances shown in FIG. 1. In other words, d3 may no longer show the precise distance between points 107 and 108. Nevertheless, this relatively minor inaccuracy may be easily outweighed by the benefits discussed below.

At first glance, it may seem like by sliding the illumination distribution to the left one has only achieved moving the undesirable contrast to the left. However, this is not the case once averaging takes place. After the slide to the left, pixels that are next to the sharp decay (i.e., pixel 811) have more ability to use pixels to the right of them to perform averaging. Thus, the sharp decay can be significantly softened. This is shown by graph 830 (see FIG. 8B) which shows the illumination distribution of graph 820 after averaging has been performed.

Thus the "sliding" of the illumination distribution as combined with the additional illumination may serve to remove any unsightly or unrealistic artifacts in the border areas between directly illuminated and indirectly illuminate regions.

The embodiments discussed herein may be implemented as software running on a computer. Furthermore, these embodiments may be implemented as hardware only computing devices or a combination of software and hardware. In most embodiments, the computer device which implements the embodiments may include an interface which allows an artist or a user to set up scenes by creating or importing various objects, placing them in an environment, placing various light sources and or translucent objects in the environment, etc. The computer device may also include an interface that provides a picture or a video of the rendered scene. The rendered video may be, for example, a movie.

In some cases, the scenes may be set up automatically by the computing device itself. For example, an embodiment of the present invention may be used to render a virtual environment or a video game. In such a case, the various scenes may be automatically set up by the computer device depending on events that are occurring in the virtual environment or video game. Therefore, in some embodiments most actions discussed herein as being performed by users, artists or operators, may be performed by suitable programmed computers instead.

Some embodiments of the present invention may be implemented on computing devices of high computing power. For example, some embodiments may be implemented on a supercomputer or a distributed computer. Other embodiments may be implemented on personal computers, video game machines, portable computers, etc.

Figure 9:
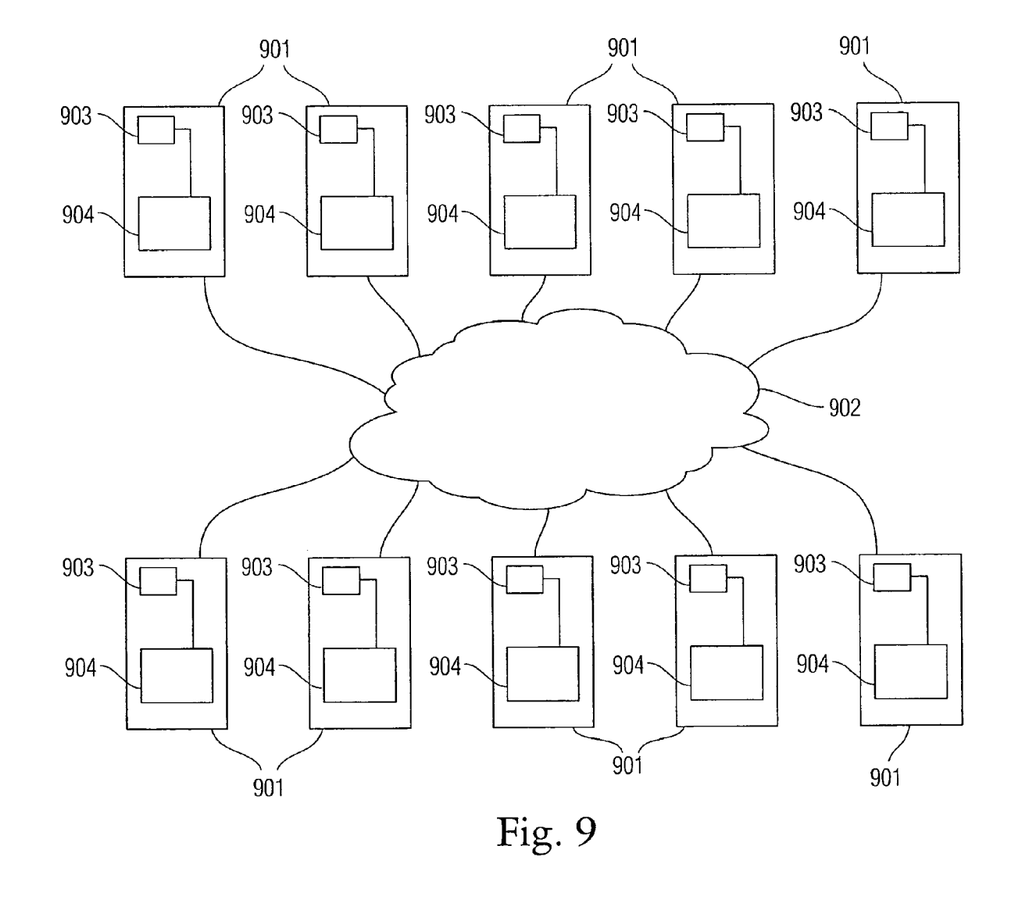
FIG. 9 is a diagram of an exemplary distributed computing system according to embodiments of the invention.

FIG. 9 shows an embodiment implemented on a distributed computer system. In the distributed computing example of FIG. 9, a plurality of computers 901 execute a software application implementing the present invention in parallel. Each computer 901 includes a processor 903 and memory 904. The computers may render different portions of a scene or different scenes in parallel. The computers communicate through a network 902. The software application may exist in its entirety in the memory 903 of a single computer 901, or alternatively portions of it may be stored and executed at one or more computers. Managing components of the software application running on one or more of the computers may create and assign various tasks to other portions of the software application running on the same or other computers. The multiple computers may be positioned in proximity to each other or they may be located remotely and connected through a pervasive network, such as the Internet.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

We claim:

1. A computer-implemented method of providing a transition between first and second regions within a virtual scene, the first region being rendered by a direct illumination method and the second region being rendered using a translucent illumination method based on a transmittance distance, and the two regions being connected to one another along a border line, the second region featuring sharply diminishing illumination from the border line, the method comprising:
    adding, using a processor, an overlay of additional illumination to the first region as to make the illumination in portions of the first region that are close to the borderline similar to that of portions of the second region that are close to the border line; and
    calculating, using a processor, a shifted transmittance distance that shifts the transmittance distance, on which calculation of the illumination of the second region is based, away from the first region wherein the shifted transmittance distance is a value greater than zero.

2. The computer-implemented method of claim 1, wherein the shifted transmittance distance is calculated by taking the difference between the transmittance distance and an offset value.

3. A non-transitory computer-readable storage medium comprising a plurality of instructions, the instructions being configured to be executed by a processor and to cause the processor to provide a transition between first and second regions within a virtual scene, the first region being rendered by a direct illumination method and the second region being rendered using a translucent illumination method based on a transmittance distance, and the two regions being connected to one another along a border line, the second region featuring sharply diminishing illumination from the border line, the instructions comprising:
    adding an overlay of additional illumination to the first region as to make the illumination in portions of the first region that are close to the borderline similar to that of portions of the second region that are close to the border line; and
    calculating a shifted transmittance distance that shifts the transmittance distance, on which calculation of the illumination of the second region is based, away from the first region wherein the shifted transmittance distance is a value greater than zero.

4. The non-transitory computer-readable storage medium of claim 3, wherein the shifted transmittance distance is calculated by taking the difference between the transmittance distance and an offset value.

\* \* \* \* \*

UNITED STATES PATENT AND TRADEMARK OFFICE
CERTIFICATE OF CORRECTION

PATENT NO. : 8,730,239 B2
APPLICATION NO. : 13/418260
DATED : May 20, 2014
INVENTOR(S) : Bruce Nunzio Tartaglia et al.

Page 1 of 1

It is certified that error appears in the above-identified patent and that said Letters Patent is hereby corrected as shown below:

In the Specification:

At column 7, line number 52, delete "$f_{decayb}$" and insert -- $f_{decayB}$ --, therefor.

At column 8, line number 32, delete "al" and insert -- all --, therefor.

At column 11, line number 63, delete "$I_{additional} = 1\ (N \cdot L)$," and insert -- $I_{additional} = 1-(N \cdot L)$, --, therefor.

At column 12, line number 3, before "largest", insert -- is --, therefor.

At column 13, line number 2, delete "and or" and insert -- and/or --, therefor.

Signed and Sealed this
Fourteenth Day of October, 2014

Michelle K. Lee
*Deputy Director of the United States Patent and Trademark Office*